US008526448B2

(12) United States Patent
Velandy et al.

(10) Patent No.: US 8,526,448 B2
(45) Date of Patent: Sep. 3, 2013

(54) CALL LOCALIZATION AND PROCESSING OFFLOADING

(75) Inventors: Rajesh Velandy, Nashua, NH (US); Rajesh Ramankutty, Nashua, NH (US); Arun C. Alex, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 12/907,575

(22) Filed: Oct. 19, 2010

(65) Prior Publication Data

US 2012/0093167 A1   Apr. 19, 2012

(51) Int. Cl.
*H04L 12/56* (2006.01)
*H04J 1/16* (2006.01)

(52) U.S. Cl.
USPC ............ 370/401; 370/252; 370/352; 370/467

(58) Field of Classification Search
USPC .................. 370/400, 401, 352, 252, 466, 467
See application file for complete search history.

(56) References Cited

U.S. PATENT DOCUMENTS

| | | | |
|---|---|---|---|
| 6,522,880 B1 | 2/2003 | Verma et al. | |
| 6,654,792 B1 | 11/2003 | Verma et al. | |
| 6,922,411 B1 | 7/2005 | Taylor | |
| 2004/0088385 A1 | 5/2004 | Blanchet et al. | |
| 2004/0136337 A1 | 7/2004 | Warrier et al. | |
| 2004/0236855 A1 | 11/2004 | Peles | |
| 2005/0078691 A1 | 4/2005 | Davison et al. | |
| 2005/0286504 A1 | 12/2005 | Kwon | |
| 2006/0018328 A1 | 1/2006 | Mody et al. | |
| 2006/0268900 A1* | 11/2006 | Larsson et al. | 370/401 |
| 2006/0268901 A1 | 11/2006 | Choyi et al. | |
| 2007/0097983 A1 | 5/2007 | Nylander et al. | |
| 2007/0105568 A1 | 5/2007 | Nylander et al. | |
| 2007/0253371 A1 | 11/2007 | Harper et al. | |
| 2008/0176582 A1 | 7/2008 | Ghai et al. | |
| 2008/0298309 A1 | 12/2008 | DePietro et al. | |

(Continued)

FOREIGN PATENT DOCUMENTS

EP   1933520 A1   6/2008
WO   WO-2007/120915 A2   10/2007

OTHER PUBLICATIONS

Chowdhury, K. et al., "Network Based Layer 3 Connectivity and Mobility Management for IPv6," draft-chowdhury-netmip6-01.txt Network Working Group, Internet Draft, Sep. 8, 2006, http://tools.ietf.org/html/draft-chowdhury-netmip6-01 (20 pages).

(Continued)

*Primary Examiner* — John Pezzlo
(74) *Attorney, Agent, or Firm* — Wilmer Cutler Pickering Hale and Dorr LLP

(57) ABSTRACT

In one embodiment, a gateway implements: receiving an indication that a first and a second end point of a communication session are both associated with a first gateway, the first gateway in communication with a second gateway to access services; receiving from the first end point at the first gateway a compressed packet; and communicating within the first gateway, the compressed packet from the first end point to the second end point, where the communicating is initiated in response to the indication that the first and second end points of the communication session are both associated with the first gateway, and where the communicated compressed packet is communicated through the first gateway without passing through the second gateway.

20 Claims, 4 Drawing Sheets

(56) References Cited

U.S. PATENT DOCUMENTS

| | | |
|---|---|---|
| 2008/0310404 A1 | 12/2008 | Valme et al. |
| 2009/0086742 A1 | 4/2009 | Ghai et al. |
| 2009/0141625 A1 | 6/2009 | Ghai et al. |
| 2009/0156213 A1 | 6/2009 | Spinelli et al. |
| 2009/0285225 A1 | 11/2009 | Dahod |
| 2010/0027448 A1 | 2/2010 | Puthiyandyil et al. |
| 2010/0039978 A1 | 2/2010 | Rangan |
| 2010/0039993 A1 | 2/2010 | Ramankutty et al. |
| 2010/0041373 A1 | 2/2010 | Ramankutty et al. |
| 2010/0085978 A1 | 4/2010 | Ramankutty et al. |
| 2010/0091653 A1 | 4/2010 | Koodli et al. |
| 2010/0302997 A1* | 12/2010 | Park et al. .................. 370/315 |
| 2011/0075563 A1* | 3/2011 | Leung et al. .................. 370/236 |

OTHER PUBLICATIONS

Chowdhury, K., "Fast Handoff support for HRPD," 3rd Generation Partnership Project 2, "3GPP2," Apr. 24, 2006. (22 pages).

Chowdhury, K., "Network Based L3 Connectivity and Mobility Management for IPv4," draft-chowdhury-netmip4-00.txt, Feb. 25, 2006, http://tools.ietf.org/hmtl/draft-chowdhury-netmip4-00 (15 pages).

U.S. Appl. No. 61/177,491, filed May 12, 2009 (18 pages).

Devarapalli, V. et al., "Proxy Mobile IPv6 and Mobil IPv6 interworking," draft-devarapalli-netlmm-pmipv6-mipv6-00.txt, NETLMM Working Group, Internet Draft, Apr. 10, 2007, http://tools.ietf.org/html/draft-devarapalli-netlmm-pmipv6-mipv6-00 (9 pages).

Lior, A. et al., "Mobile IP Key Derivation using EAP," draft-lior-mipkeys-eap-00, Network Working Group, Feb. 25, 2006, http://tools.ietf.org/html/draft-lior-mipkeys-eap-00 (17 pages).

Navali, J. et al., "IPv6 over Network based Mobile IPv4," draft-navali-ip6-over-netmip4-00.txt, Network Working Group, Feb. 25, 2006, http://tols.ietf.org/html/draft-navali-ip6-over-netmip4-00 (20 pages).

\* cited by examiner

CALL LOCALIZATION AND PROCESSING OFFLOADING

FIELD OF THE DISCLOSURE

This disclosure relates to providing packet processing on a network.

BACKGROUND

Wireless communication technologies are used in connection with many applications, including, for example, satellite communications systems, portable digital assistants (PDAs), laptop computers, and other mobile devices (e.g., cellular telephones, user equipment). One benefit that users of such applications can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

OVERVIEW

Figure 1:
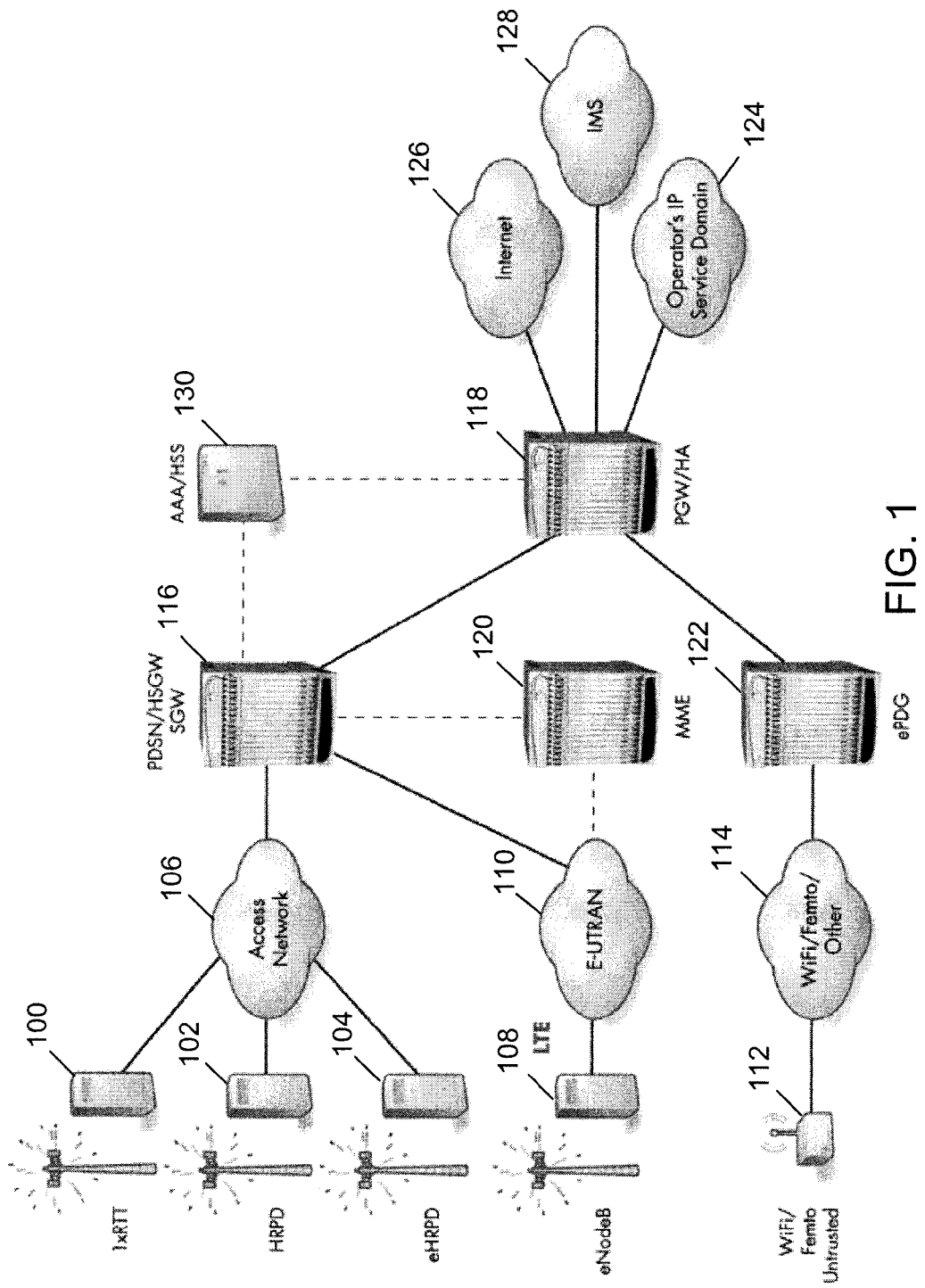
FIGS. 1-2 illustrate communication networks including a long term evolution (LTE) topology in accordance with some embodiments.

In one embodiment, a method of communication comprises receiving an indication that a first and a second end point of a communication session are both associated with a first gateway, the first gateway in communication with a second gateway to access services; receiving from the first end point at the first gateway a compressed packet; and communicating, within the first gateway, the compressed packet from the first end point to the second end point, where the communicating is initiated in response to the indication that the first and second end points of the communication session are both associated with the first gateway, and where the communicated compressed packet is communicated through the first gateway without passing through the second gateway.

In certain embodiments, the first gateway is a high-rate packet data serving gateway (HSGW) and the second gateway is a packet data network gateway (PDN-GW), and a policy and charging rules function (PCRF) node is used to generate the indication that the first and the second end point of the communication session are both associated with the first gateway. Some of these embodiments include those in which the indication that the first and the second end point of the communication session are both associated with the first gateway is received within one or more policy charging and control (PCC) rules, where in some embodiments, the HSGW is within the same device as a PCRF. In some embodiments, the compressed packet is compressed using Robust Header Compression (ROHC). Other embodiments further comprise determining that the first and a second end point of the communication session are both associated with the first gateway, wherein the determination is performed at one of a PCRF, a PDN-GW, and an HSGW, and in some of those embodiments, the determination that the first and the second end point of the communication session are both associated with the first gateway is made using a comparison of the IP source and destination of a first Real Time Protocol (RTP) bearer with the IP source and destination of a second RTP bearer.

In yet other embodiments, a system comprising a memory capable of storing data; and a processor is configured to use the data such that the system can implement one or more of the embodiments described above.

In yet other embodiments, logic is encoded in one or more non-transient media that includes code for execution that when executed by a processor is operable to perform one or more of the embodiments described above.

DESCRIPTION OF EXAMPLE EMBODIMENTS

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

FIG. 1 illustrates a communication network that includes a gateway implementing call localization in accordance with certain embodiments. FIG. 1 shows a network that includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies, such as WiFi, Femto, WiMAX, or any other radio spectrum technology, are represented as using an appropriate transceiver 112 to connect to the network using a broadband or other access network.

The access network 106 can communicate with an access gateway 116 that implements a combination of functionalities such as a packet data serving node (PDSN), a HRPD serving gateway (HSGW), and/or a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118 that can implement a packet data network gateway (PDN-GW) and a Home Agent (HA), and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway 118 can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place includes the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PDN-GW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PDN-GW 118 components. In some embodiments, one or more EPC components can be implemented on the same gateway or chassis as described below.

The SGW 116 is in a user plane where it forwards and routes packets to and from the eNodeB 108 and PDN-GW 118. The SGW 116 also serves as a local mobility anchor for inter-eNodeB handover and mobility between 3GPP networks. The SGW 116 routes and forwards user data packets, while also acting as the mobility anchor for the user plane during inter-eNodeB handovers, and as an anchor for mobility between LTE and other 3GPP technologies (terminating the S4 interface and relaying the traffic between 2G/3G systems and PDN-GW 118). For idle state user equipment devices (UEs), the SGW 116 terminates the down link data path and triggers paging when down link data arrives for the UE. The SGW 116 manages and stores UE contexts, e.g., parameters of the IP bearer service and network internal routing information. The SGW 116 also performs replication of the user traffic in case of lawful interception.

The PDN-GW 118 acts as the interface between the LTE network and other packet data networks, such as the Internet or SIP-based IMS networks (fixed and mobile). The PDN-GW 118 serves as an anchor point for intra-3GPP network mobility, as well as mobility between 3GPP and non-3GPP networks. The PDN-GW 118 acts as the Policy and Charging Enforcement Function (PCEF), which manages Quality of Service (QoS), online/offline flow-based charging data generation, deep-packet inspection, and lawful intercept. The PDN-GW 118 provides connectivity to the UE to external packet data networks by being the point of exit and entry of traffic for the UE. A UE may have simultaneous connectivity with more than one PDN-GW for accessing multiple packet data networks. The PDN-GW 118 performs policy enforcement, packet filtering for each user, charging support, lawful interception, and packet screening. The PDN-GW also provides an anchor for mobility between 3GPP and non-3GPP technologies such as WiMAX and 3GPP2 standards (CDMA 1X and EV-DO).

The MME 120 resides in the EPC control plane and manages session states, authentication, paging, mobility with 3GPP 2G/3G nodes, roaming, and other bearer management functions. The MME 120 can be a standalone element or integrated with other EPC elements, including the SGW 116, PDN-GW 118, and Release 8 Serving GPRS Support Node (SGSN). The MME 120 can also be integrated with 2G/3G elements, such as the SGSN and GGSN. This integration is the key to mobility and session management interworking between 2G/3G and 4G mobile networks.

MME 120 is a control-node for the LTE access network. The MME 120 is responsible for UE tracking and paging procedures including retransmissions. MME 120 handles the bearer activation/deactivation process and is also responsible for choosing the SGW for a UE during the initial attachment and at time of an intra-LTE handover. The MME 120 also authenticates the user by interacting with the HSS 130. The MME 120 also generates and allocates temporary identities to UEs and terminates Non-Access Stratum (NAS) signaling. The MME 120 checks the authorization of the UE to camp on the service provider's Public Land Mobile Network (PLMN) and enforces UE roaming restrictions. The MME 120 is the termination point in the network for ciphering/integrity protection for NAS signaling and handles the security key management. Lawful interception of signaling is also supported by the MME 120. The MME 120 also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PDN-GW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Access gateway 116 can access and maintain information relating to the communication session, the subscriber, the radio bearers, and the policies relating to the communication session. The gateway 116 may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

HSGW Call Localization

Figure 2:
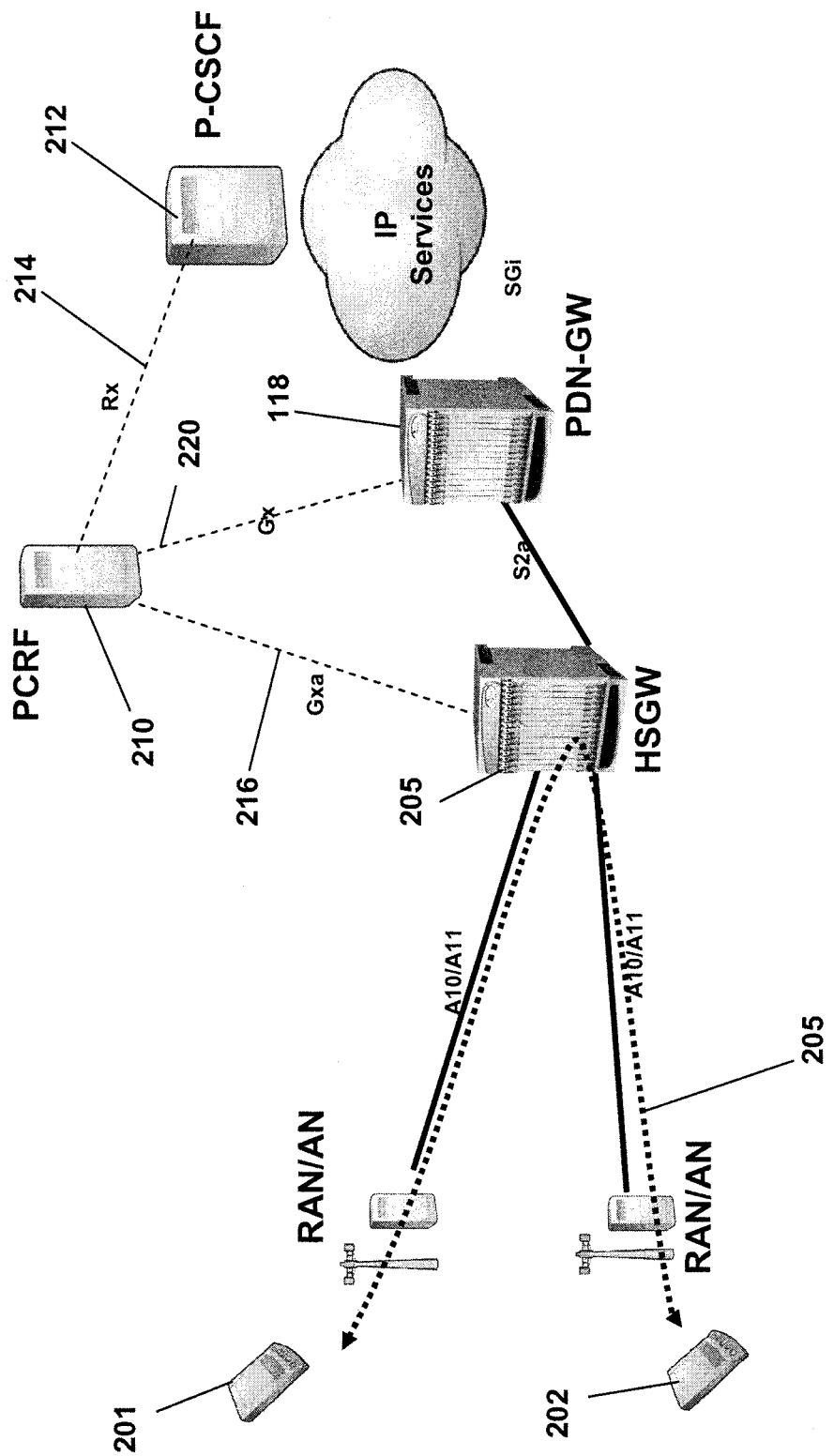

FIG. 2 illustrates a communication network that implements HSGW call localization in accordance with certain embodiments. One example of call localization involves the decision to invoke localized data forwarding at the HSGW when the system detects that the two end points of a communication session are on the same HSGW.

For example, UE1 201 and UE2 202 may share a communication path between them, such as a peer-to-peer VoIP, IMS, or video connection, through their attachment to common HSGW 205. Without localization, the normal bearer communication path for data from UE1 201 to UE2 202 would encompass the following path: (1) HSGW 205 receiving data packets from UE1 201; (2) HSGW 205 forwarding the packets to PDN-GW 118; (3) PDN-GW 118 further forwarding the packets back to HSGW 205; (4) and finally, HSGW 205 sending packets back to UE2 202.

However, when the system detects that the data path may be confined to HSGW 205, the communication path can be modified, effectively bridging the data at HSGW 205, as represented by localized data path 205. When peer to peer voice or video calls are made, and the subscribers are in the same network, the HSGW 205 can optimize the traffic between the two, bypassing PDN-GW 118. Doing so can reduce both delay and jitter in peer-to-peer traffic, especially real-time traffic.

Detection of a communication path as being confinable to HSGW 205 can be done using any one or a combination of several network elements, including the policy and charging rules function (PCRF) node 210, PDN-GW 118, and/or the HSGW 205 itself. For example, the following detection method for a VoIP call can be implemented in a PDN-GW or in a SGW such as HSGW 205.

First, when UE1 201 or UE2 202 begins the setup process for a communication path, such as setting up a VoIP call, SIP application functions, including a Proxy Call Session Control Function (P-CSCF) 212, and PCRF 210, perform signaling over Rx interface 214 to process the UE's SIP registration functions. When UE 201 or 202 completes SIP signaling with P-CSCF 212, P-CSCF 212 sends Real-time Transport Protocol (RTP) end point information (which can involve Session Description Protocol, SDP information) to PCRF 210 via Rx Interface 214. This registration signaling can include information about the UE's location as well as related data. For example, the signaling may include a Media Component Description Attribute-Value Pair (AVP), containing a Media-Sub-Component AVP, which in turn can contain one or more Flow-Description AVPs. The Flow-Description AVPs define a packet filter for an IP flow, and include RTP information on the source and destination IP address and port of the RTP bearer that is being established for the UE.

This registration information can be stored by the PCRF 210, together with an associated identifier of the gateway involved in the setup process, and the IP address of the UE being registered. The gateway identifier may be the address of HSGW 205 (available via Gxa interface 216), or the address of PDN-GW 118 (available via Gx interface 220). After both UE's have participated in their respective setup processes, this stored information can be used to determine whether the two UEs are associated with the same HSGW by comparing the UE's respective registration information.

At the time of bearer activation, HSGW 205 signals the information associated with the activation to PCRF 210. The PCRF 210 can then determine that the two legs of the VoIP call that are associated with UE1 201 and UE2 202 are on the same HSGW 205, and in response, instruct HSGW 205 to start local forwarding of the bearer traffic between UE1 201 and UE2 202. Specifically, if PCRF 210 finds that there are two RTP bearers from the same gateway where the (source ip:port and destination ip:port) of the first bearer matches with the (destination ip:port and source ip:port) of the second, the RTP flow may be locally forwarded (e.g., looped) at the gateway.

PCRF 210 can indicate to HSGW 205 that the HSGW is to begin forwarding by PCRF 210 sending HSGW 205 one or more policy charging and control (PCC) rules or by using other signaling. For example, PCRF 210 can determine one or more PCC rules based on its determination that both endpoints of the bearer activation share the same gateway, and then send the PCC rules to HSGW 205 via Gxa interface 216. Similarly, if PCRF 210 or another network element detects that the two legs of a VoIP call are on the same PDN-GW 118, localized forwarding of the bearer traffic between UE1 201 and UE2 202 can commence at PDN-GW 118. A similar mechanism can be implemented on a PMIP-SGW (not shown), where the localization signaling from the PCRF 210 to the PMIP-SGW is performed over the Gxc interface. PCRF 210 can also communicate with PDN-GW 118 over Gx Interface 220.

Figure 4:
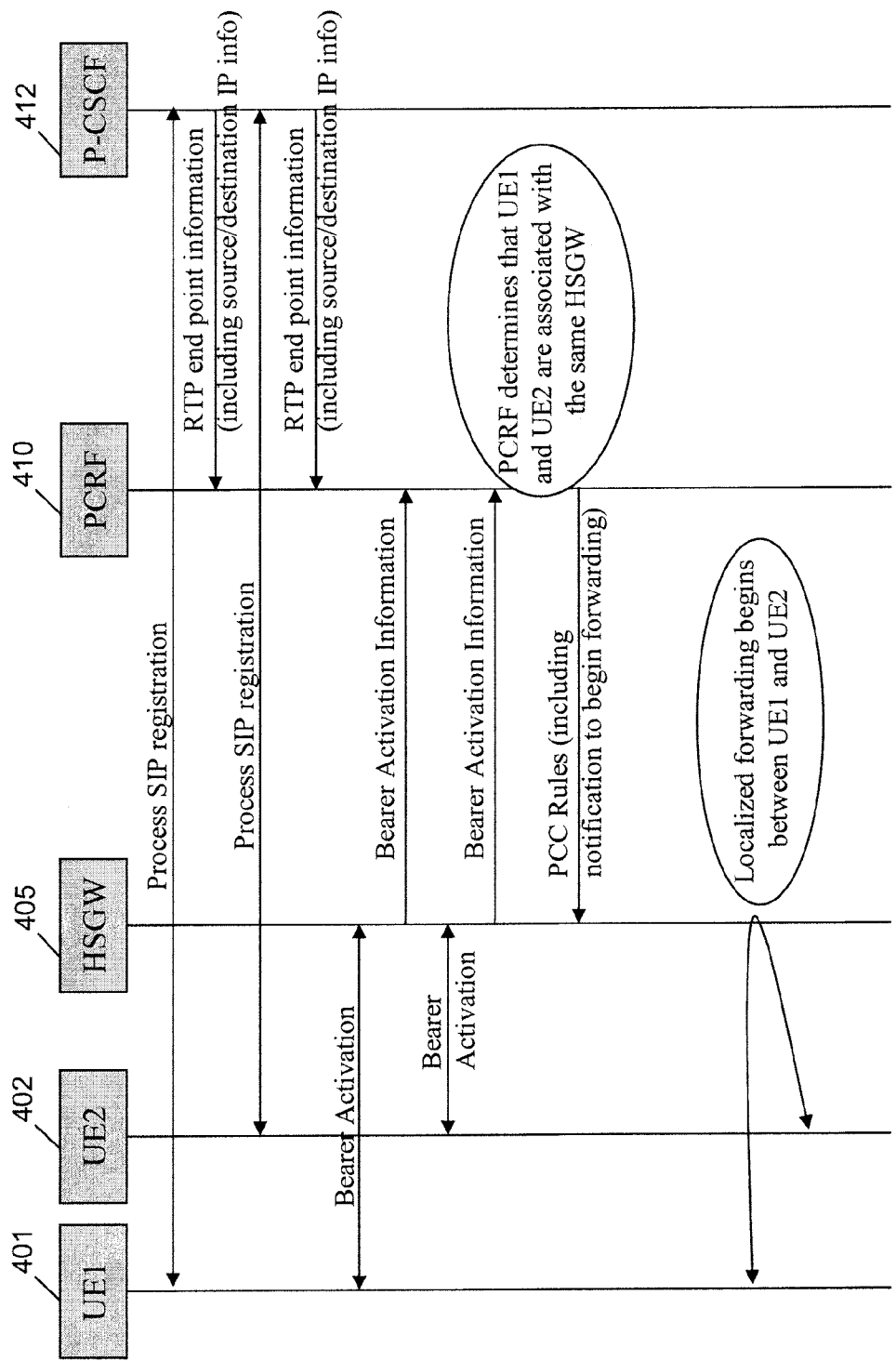
FIG. 4 is a flow diagram showing operation of call localization in accordance with certain embodiments.

FIG. 4 illustrates an example of the above-described detection and localized forwarding. First, UE1 401 begins to set up a communication path by performing SIP signaling with P-CSCF 412. P-CSCF 412 sends RTP end point information to PCRF 410, including Flow-Description AVPs with RTP information on the source and destination IP address and port of the RTP bearer being established for UE1 401. UE2 402 then performs its own SIP signaling with P-CSCF 412 to setup a communication path for UE2 402, and P-CSCF 412 sends RTP end point information to PCRF 410 with source and destination IP address and port information for the RTP bearer being established for UE2 402.

At the time of bearer activation, HSGW 405 signals the information associated with the activation to PCRF 410. The PCRF 410 can then determine that the two legs of the VoIP call that are associated with UE1 401 and UE2 402 are on the same HSGW 405, and in response, instruct HSGW 405 to start local forwarding of the bearer traffic between UE1 401 and UE2 402. Specifically, if PCRF 410 finds that there are two RTP bearers from the same gateway where the (source ip:port and destination ip:port) of the first bearer matches with the (destination ip:port and source ip:port) of the second, the RTP flow may be locally forwarded (e.g., looped) at the gateway.

PCRF 410 can indicate to HSGW 405 that the HSGW is to begin forwarding by PCRF 410 sending HSGW 405 one or more policy charging and control (PCC) rules or by using other signaling. For example, PCRF 410 can determine one or more PCC rules based on its determination that both endpoints of the bearer activation share the same gateway, and then send the PCC rules to HSGW 405 via Gxa interface 416. Similarly, if PCRF 410 or another network element detects that the two legs of a VoIP call are on the same PDN-GW 118, localized forwarding of the bearer traffic between UE1 401 and UE2 402 can commence at PDN-GW 118. A similar mechanism can be implemented on a PMIP-SGW (not shown), where the localization signaling from the PCRF 410 to the PMIP-SGW is performed over the Gxc interface. PCRF 410 can also communicate with PDN-GW 118 over Gx Interface 240.

The detection of a common gateway between two or more UEs described above can also be accomplished by a PDN-GW or a HSGW. In such cases, the PDN-GW or HSGW will extract and store the necessary IP address information to permit the detection of two RTP bearers where the (source ip:port and destination ip:port) of the first bearer matches with the (destination ip:port and source ip:port) of the second.

Local forwarding ends when the session between the UEs ends, or in other situations where the normal bearer communication path is no longer localized in the HSGW. In the event of inter-HSGW handovers (when, for example, the UEs are mobile nodes) or the addition of additional call legs to the original set of communicating UEs, the system can fall back to normal forwarding via the PDN-GW.

When call localization is performed, HSGW 205 may also offload compression/decompression tasks that HSGW 205 could otherwise have performed on the bearer between the UEs of a localized communication session. Such compression/decompression offloading from the network to the UEs can decrease both communication latency between the UEs, as well as the amount of processing within the network. As part of this offloading, HSGW 205 can exchange compression contexts between UEs 201 and 202.

Without offloading, HSGW 205 performs Robust Header Compression (ROHC) and decompression for packets that HSGW 205 sends or receives (respectively) to each of the UEs attached to HSGW 205. ROHC is a set of methods to compress the IP, UDP, RTP, and/or TCP headers of Internet packets. Additional information on ROHC is provided in Bormann, et al., RFC 3095, which is incorporated herein by reference as Exhibit 1. For example, when a packet is sent from UE1 201 to UE2 202, one or both UEs can implement ROHC to minimize their consumption of the link resources between each respective UE and the associated RAN/AN and/or HSGW, such as HSGW 205. When UE1 201 sends a packet, UE1 first compresses the packet's header before sending it to HSGW 205. Without offloading and localization, when the packet is subsequently received by HSGW 205, the HSGW implements header decompression (restoring the original packet header) prior to forwarding the received packet to PDN-GW 118 on its way to its final destination, e.g., UE2 202. Similarly, when HSGW 205 receives a packet destined for one of the UEs connected to the HSGW (i.e., from PDN-GW 118), the HSGW performs header compression before sending the packet to the destination, i.e., UE2 202, where the destination UE then decompresses the header as necessary to process it. In the case of HSGW 205 receiving a packet from UE1 201 to UE2 202, where the path between the UEs is localized to the HSGW, the HSGW would normally decompress and then recompress the header of the packet before sending it to UE2 202. UE2 202 would then decompress the packet's header as necessary.

Compression/decompression offloading allows the UEs to perform the compression and decompression themselves without requiring the HSGW (or some other localized gateway in which the UE's communication session is localized) to do so. Offloading these tasks to the UEs may entail exchanging ROHC contexts between the UEs. For example, HSGW 205 can provide ROHC context information to each respective UE in a localized call so that each UE can do its own decompression of ROHC information received from the other UE(s). This allows HSGW 205 to avoid having to first decompress and then recompress header information between UEs whose calls are localized on the HSGW. Instead, HSGW 205 can directly forward packets containing compressed header information between the UEs that are involved in the localized call without (or with reduced) decompression and recompression of the headers. In addition to ROHC compression, other bearer level functions between the UEs involved in the localized call can be offloaded, including other data compression.

Because ROHC contexts are maintained between peers, ROHC contexts are maintained for the duration of the call. The contexts may contain such information as static fields and reference values for compression and decompression. Additional information describing the packet stream may also be part of the context, for example, information about the IP identifier field, and information regarding the inter-packet increase in sequence numbers or timestamps.

Mobile Subscriber

The mobile subscribers described earlier can communicate with a plurality of radio access networks using a plurality of access technologies and with wired communication networks. The mobile subscriber can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile subscriber may have the capability to run applications or communicate with applications that are provided by servers in the communication network. The user equipment can receive updates and other information from these applications on the network.

The mobile subscriber also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The mobile subscriber can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

Gateway

The gateway described herein can implement multiple and different integrated functionalities. In some embodiments, one or more of an access service network gateway (ASNGW), mobility access gateway (MAG), an HRPD serving gateway (HSGW), a mobility management entity (MME), a packet data serving node (PDSN), a foreign agent (FA), a local mobility anchor (LMA), a PDN gateway (P-GW), a home agent (HA) can be implemented on a gateway. Other types of functionalities can also be implemented on a gateway in other embodiments are a Gateway General packet radio service Support Node (GGSN), a serving GPRS support node (SGSN), a packet data inter-working function (PDIF), a base station, a access network, a User Plane Entity (UPE), an IP Gateway, an access gateway, a session initiation protocol (SIP) server, P-CSCF, a PCRF, and an interrogating-call session control function (I-CSCF). In certain embodiments, one or more of the above-mentioned other types of functionalities are integrated together or provided by the same functionality. For example, an access network can be integrated with a PDSN. A gateway can include a PDSN, a FA, a HA, a GGSN, a PDIF, an ASNGW, a UPE, an IP Gateway, an access gateway, or any other applicable access interface device. The gateway can also support sessions originated from a Femto base station, which would connect to the gateway through a broadband network. A person or corporation may use a Femto base station in a home or business to support one or more mobile subscribers. The gateway can provide trigger based traffic management during a handoff from a Femto base station to a WiMAX or other macro base station, while maintaining traffic management for the mobile node. In certain embodiments, a gateway is provided by Starent Networks, Corp. of Tewksbury, Mass. in a ST16 or a ST40 multimedia platform.

Figure 3:
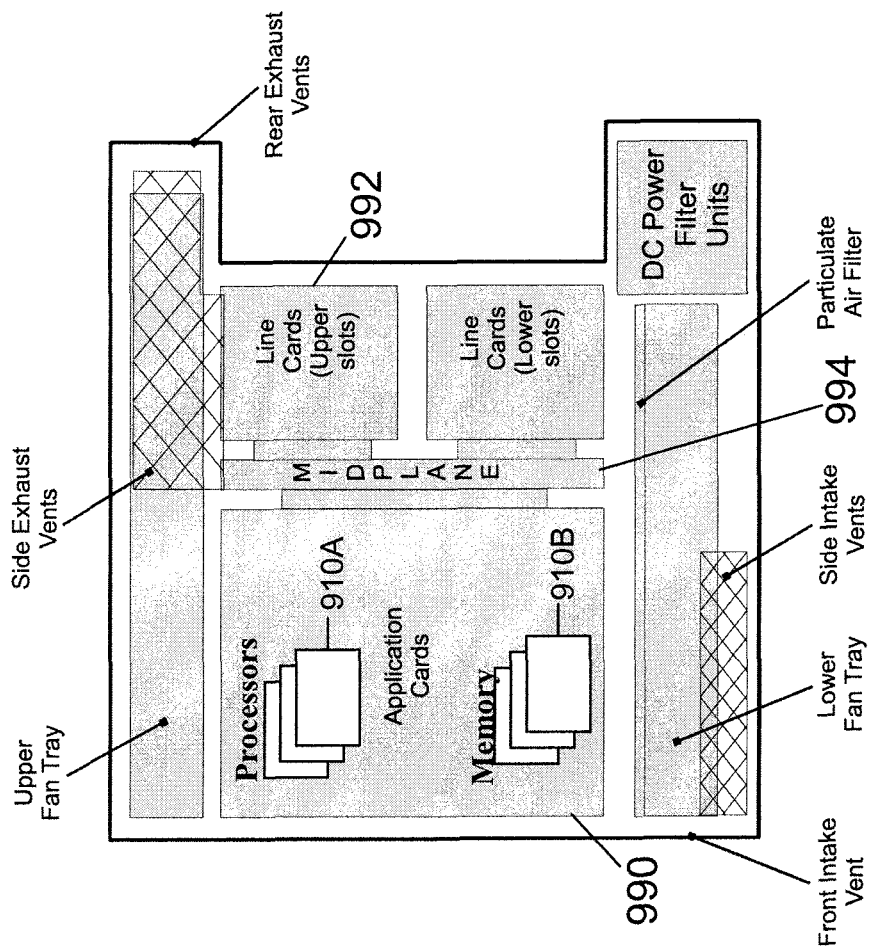
FIG. 3 illustrates a gateway in accordance with certain embodiments.

The features of a chassis that implements a gateway, in accordance with some embodiments, are further described below. FIG. 3 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multithreaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the gateway such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a MAG, LMA, HSGW, P-GW, MME, PDSN, ASNGW, PDIF, HA, GGSN, or IPSG).

The gateway's software can be divided into a series of tasks that perform specific functions. These tasks communicate with each other as needed to share control and data information throughout the gateway. A task is a software process that performs a specific function related to system control or session processing. Three types of tasks operate within the gateway in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway by monitoring the various software and hardware components of the gateway. Recovery control task subsystem is responsible for executing a recovery action for failures that occur in the gateway and receives recovery actions from the high availability task subsystem. Shared configuration task subsystem provides the gateway with an ability to set, retrieve, and receive notification of gateway configuration parameter changes and is responsible for storing configuration data for the applications running within the gateway. Resource management subsystem is responsible for assigning resources (e.g., processor and memory capabilities) to tasks and for monitoring the task's use of the resources.

The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Many of the steps described above can be performed in software that can be stored in computer-readable memory as instruction that, when executed, perform the steps, such as detecting when EU to EU traffic may be localized on an access gateway, offloading compression and decompression tasks, exchanging ROHC contexts, and managing localized traffic for a bearer. In some embodiments, the software needed for implementing the steps described above include a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present disclosure has been described and illustrated in the foregoing exemplary embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, an LTE functionality such as an HRPD serving gateway can be combined into a single device or otherwise co-located with a PDSN.

What is claimed is:

1. A method comprising:
receiving a first indication, for a first and a second user equipment (UE) associated with a first gateway in communication with a second gateway to access services, that the first UE has identified the second UE as a remote endpoint of a first communication session;
receiving a second indication that the second UE has identified the first UE as a remote endpoint of a second communication session;
receiving from the first UE at the first gateway a compressed packet; and
communicating, within the first gateway, the compressed packet from the first UE to the second UE, wherein the communicating is initiated in response to the first indication and the second indication, and wherein the forwarded compressed packet is communicated through the first gateway without passing through the second gateway.

2. The method of claim 1, wherein the first gateway is a high-rate packet data serving gateway (HSGW) and the second gateway is a packet data network gateway (PDN-GW), and wherein a policy and charging rules function (PCRF) node is used to generate the first and second indications.

3. The method of claim 2, wherein the first and second indications are received within one or more policy charging and control (PCC) rules.

4. The method of claim 3, wherein the HSGW is within the same device as a PCRF.

5. The method of claim 1, wherein the compressed packet is compressed using Robust Header Compression.

6. The method of claim 1, further comprising determining that the remote endpoint of the first communication session and the remote endpoint of the second communication session are both associated with the first gateway, wherein the determination is performed at one of a policy and charging rules function (PCRF), a packet data network gateway (PDN-GW), and a high-rate packet data serving gateway (HSGW).

7. The method of claim 6, wherein the identification of the second UE as a remote endpoint of a first communication session, and the identification of the first UE as a remote endpoint of a second communication session, is performed by comparing the IP source and destination of a first Real Time Protocol (RTP) bearer with the IP source and destination of a second RTP bearer.

8. A gateway comprising:
a memory capable of storing data;
a first network interface in communication with a first and a second user equipment (UE);
a second network interface in communication with a second gateway, the second gateway for providing access to services;
and
a processor connected to the first network interface and the second network interface, and configured to forward packets from the first network interface to the second network interface, and configured to use the stored data such that the gateway can:
receive an indication that the first UE has identified the second UE as a remote endpoint of a communication session;
receive from the first UE via the first network interface a compressed packet; and
communicate, within the gateway, the compressed packet from the first UE to the second UE, wherein the communication is initiated in response to the indication that the first UE has identified the second UE as a remote endpoint of a communication session, and wherein the communicated compressed packet is communicated through the first user interface without passing through the second network interface.

9. The gateway of claim 8, wherein the gateway is a high-rate packet data serving gateway (HSGW) and the second gateway is a packet data network gateway (PDN-GW), and wherein a policy and charging rules function (PCRF) node is connected to the HSGW and the PCRF node is configured to generate an indication that the first and the second end point of the communication session are both associated with the first gateway.

10. The gateway of claim 9, wherein the indication that the first and the second end point of the communication session are both associated with the first gateway is received within one or more policy charging and control (PCC) rules.

11. The gateway of claim 10, wherein the HSGW is within the same device as a PCRF.

12. The gateway of claim 8, wherein the compressed packet is compressed using Robust Header Compression.

13. The gateway of claim 8, the processor being further configured to receive an indication that the first and the second end point of a communication session are both associated with the first gateway, wherein the indication is received from one of a policy and charging rules function (PCRF), a packet data network gateway (PDN-GW), and a high-rate packet data serving gateway (HSGW).

14. The gateway of claim 8, wherein the indication that the first UE has identified the second UE as a remote endpoint of a communication session is based upon a comparison of the IP source and destination of a first Real Time Protocol (RTP) bearer with the IP source and destination of a second RTP bearer.

15. Logic encoded in one or more non-transient media that includes code for execution and when executed by a processor is operable to perform operations comprising:

receiving a first indication, for a first and a second user equipment (UE) associated with a first gateway in communication with a second gateway to access services, that the first UE has identified the second UE as a remote endpoint of a first communication session;

receiving a second indication that the second UE has identified the first UE as a remote endpoint of a second communication session;

receiving from the first UE at the first gateway a compressed packet; and communicating, within the first gateway, the compressed packet from the first UE to the second UE, wherein the communicating is initiated in response to the first indication and the second indication, and wherein the forwarded compressed packet is communicated through the first gateway without passing through the second gateway.

16. The logic of claim 15, wherein the first gateway is a high-rate packet data serving gateway (HSGW) and the second gateway is a packet data network gateway (PDN-GW), and wherein a policy and charging rules function (PCRF) node is used to generate the first and second indications.

17. The logic of claim 16, wherein the first and second indications are received within one or more policy charging and control (PCC) rules.

18. The logic of claim 17, wherein the HSGW is within the same device as a PCRF.

19. The logic of claim 15, wherein the compressed packet is compressed using Robust Header Compression.

20. The logic of claim 15, wherein a first and a second indication that the first and the second end point of a communication session are both associated with the first gateway are received from one of a policy and charging rules function (PCRF), a packet data network gateway (PDN-GW), and a high-rate packet data serving gateway (HSGW).

* * * * *